United States Patent
Yamada et al.

(10) Patent No.: US 10,082,775 B2
(45) Date of Patent: Sep. 25, 2018

(54) APPLIANCE CONTROL METHOD AND APPARATUS FOR CONTROLLING A TARGET APPLIANCE IN A BUILDING TO DISGUISE THE NUMBER OF PEOPLE IN THE BUILDING

(71) Applicant: Panasonic Corporation, Osaka (JP)

(72) Inventors: Kazunori Yamada, Hyogo (JP); Kozo Ezawa, Osaka (JP); Kumi Harada, Chiba (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1122 days.

(21) Appl. No.: 13/979,220

(22) PCT Filed: Mar. 6, 2013

(86) PCT No.: PCT/JP2013/001395
§ 371 (c)(1),
(2) Date: Jul. 11, 2013

(87) PCT Pub. No.: WO2013/132845
PCT Pub. Date: Sep. 12, 2013

(65) Prior Publication Data
US 2014/0114484 A1    Apr. 24, 2014

(30) Foreign Application Priority Data

Mar. 9, 2012 (JP) .................................. 2012-053648

(51) Int. Cl.
*G05B 15/02* (2006.01)
*G08B 15/00* (2006.01)
(Continued)

(52) U.S. Cl.
CPC ........... *G05B 15/02* (2013.01); *G08B 15/002* (2013.01); *G08C 17/02* (2013.01); *G08C 23/04* (2013.01);
(Continued)

(58) Field of Classification Search
None
See application file for complete search history.

(56) References Cited

U.S. PATENT DOCUMENTS 6,377,858 B1 * 4/2002 Koeppe .................. G05B 15/02 700/12
6,604,023 B1 * 8/2003 Brown .................. F24F 11/0086 700/276

(Continued)

FOREIGN PATENT DOCUMENTS

| JP | 2005-25435 | 1/2005 |
| JP | 2005-277965 | 10/2005 |

(Continued)

OTHER PUBLICATIONS

Zhu et al. "Design and Realization of Home Appliances Control System Based on The Android Smartphone", 2012 IEEE, pp. 56-59.*

(Continued)

*Primary Examiner* — Van Nguyen
(74) *Attorney, Agent, or Firm* — Wenderoth, Lind & Ponack, L.L.P.

(57) ABSTRACT

An appliance control method is for controlling a target appliance located in a building to disguise the number of people in the building. The method includes: obtaining an operation history of the target appliance (S101); determining a change in the number of people in the building (S102); creating, based on the operation history and the change in the number of people in the building, control patterns each (Continued)

of which is for controlling the target appliance and corresponds to a different one of the numbers of people including the number of people (S103); selecting, from among the created control patterns each of which corresponds to a different one of the numbers of the people, a control pattern which corresponds to the predetermined virtual number of people (S111); and controlling the target appliance according to the selected control pattern (S112).

15 Claims, 18 Drawing Sheets

(51) Int. Cl.
G08C 17/02 (2006.01)
G08C 23/04 (2006.01)
H05B 37/02 (2006.01)

(52) U.S. Cl.
CPC ..... *H05B 37/0227* (2013.01); *H05B 37/0281* (2013.01); *Y02B 20/42* (2013.01)

(56) References Cited

U.S. PATENT DOCUMENTS

| | | | | |
|---|---|---|---|---|
| 7,778,734 B2* | 8/2010 | Oswald | ............... | G05B 15/02 340/662 |
| 7,805,528 B2* | 9/2010 | Park | ............... | G06F 3/0219 455/410 |
| 8,209,062 B2* | 6/2012 | Andrews | ............... | G01D 4/004 700/291 |
| 8,600,562 B2* | 12/2013 | Oswald | ............... | G05B 15/02 340/662 |
| 8,751,432 B2* | 6/2014 | Berg-Sonne | ............... | G05B 15/02 706/12 |
| 8,988,014 B2* | 3/2015 | Toda | ............... | A61M 21/00 315/129 |
| 9,043,163 B2* | 5/2015 | Mezic | ............... | G05B 15/02 702/24 |
| 9,155,169 B2* | 10/2015 | Vargas | ............... | H05B 37/0227 |
| 2007/0073870 A1* | 3/2007 | Park | ............... | G06F 3/0219 709/224 |
| 2011/0018817 A1* | 1/2011 | Kryze | ............... | G08C 17/02 345/173 |

FOREIGN PATENT DOCUMENTS

| | | |
|---|---|---|
| JP | 2006-333049 | 12/2006 |
| JP | 2007-265050 | 10/2007 |
| JP | 2008-148016 | 6/2008 |
| JP | 2009-290475 | 12/2009 |

OTHER PUBLICATIONS

Wang et al. "Occupancy Pattern Based Intelligent Control for Improving Energy", 2012 IEEE, pp. 804-809.*

* cited by examiner

FIG. 6

| Appliance | Time and date | Operation detail | Control status | Estimated number of people |
|---|---|---|---|---|
| TV1 | 200X/10/10 16:00 | ON | ON | 1 |
| TV2 | 200X/10/10 18:00 | OFF | OFF | 3 |
| Light 1 | 200X/10/14 18:00 | ON | Level 3 | 2 |
| Light 4 | 200X/10/14 20:00 | OFF | OFF | 3 |

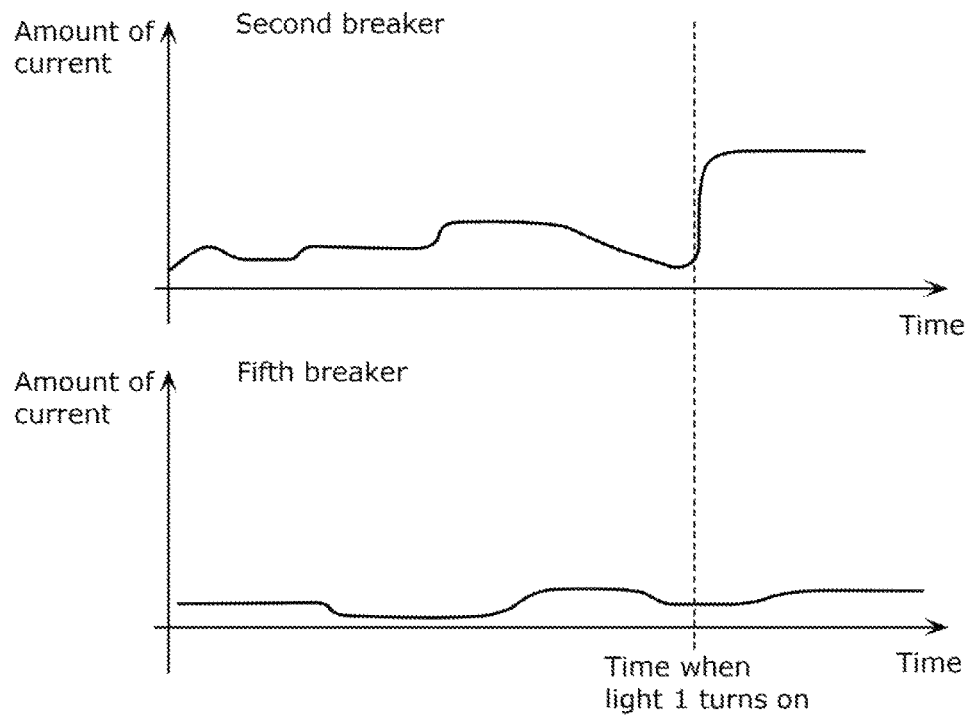

| Time | Appliance | Control instruction | Number of people | Zone | |
|---|---|---|---|---|---|
| 16:00 | TV1 | ON Ch4 | 1 | 1 | |
| 18:00 | TV2 | OFF | 2 | 2 | |
| 18:00 | Light 1 | ON Level3 | 1 | 1 | |
| 20:00 | Light 4 | ON | 3 | 3 | |
| | | | | | |
| | | | | | |
| | | | | | |

APPLIANCE CONTROL METHOD AND APPARATUS FOR CONTROLLING A TARGET APPLIANCE IN A BUILDING TO DISGUISE THE NUMBER OF PEOPLE IN THE BUILDING

TECHNICAL FIELD

The present invention relates to an appliance control method and the like for controlling an appliance located in a building to disguise the number of people therein.

BACKGROUND ART

There is a proposed technique to control a home appliance. The technique utilizes operation information and time information of the home appliance to determine a control schedule for controlling the home appliance when nobody is in the building, and controls the home appliance according to the determined control schedule (see Patent Literature 1).

CITATION LIST

Patent Literature

[PTL 1]
Japanese Unexamined Patent Application Publication No. 2005-277965

SUMMARY OF INVENTION

Technical Problem

The above conventional technique, however, is required to execute control of an appliance more appropriately for disguising the number of people in a building.

Hence, the present invention provides an appliance control method for appropriately controlling an appliance and disguising the number of people in a building.

Solution to Problem

An appliance control method according to an aspect of the present invention is for controlling a target appliance located in a building to disguise the number of people in the building. The method includes: obtaining an operation history of the target appliance; determining a change in the number of people in the building; creating, based on the operation history and the change in the number of people in the building, control patterns each of which is for controlling the target appliance and corresponds to a different one of the numbers of people including the number of people; selecting, from among the created control patterns each of which corresponds to a different one of the numbers of the people, a control pattern which corresponds to the predetermined virtual number of people; and controlling the target appliance according to the selected control pattern.

It is noted that such a comprehensive or specific aspect may be implemented in the form of, or in a combined form of, a system, an apparatus, an integrated circuit, a computer program, and a storage medium such as a compact disc read only memory.

Advantageous Effects of Invention

As described above, an implementation of the present invention can appropriately control an appliance to disguise the number of people in a building.

BRIEF DESCRIPTION OF DRAWINGS

FIG. 6 exemplifies operation history date according to Embodiment 2.

FIG. 8 shows the processing operation of the appliance location defining unit according to Embodiment 2.

FIG. 9 exemplifies appliance location information according to Embodiment 2.

DESCRIPTION OF EMBODIMENTS

Figure 1:
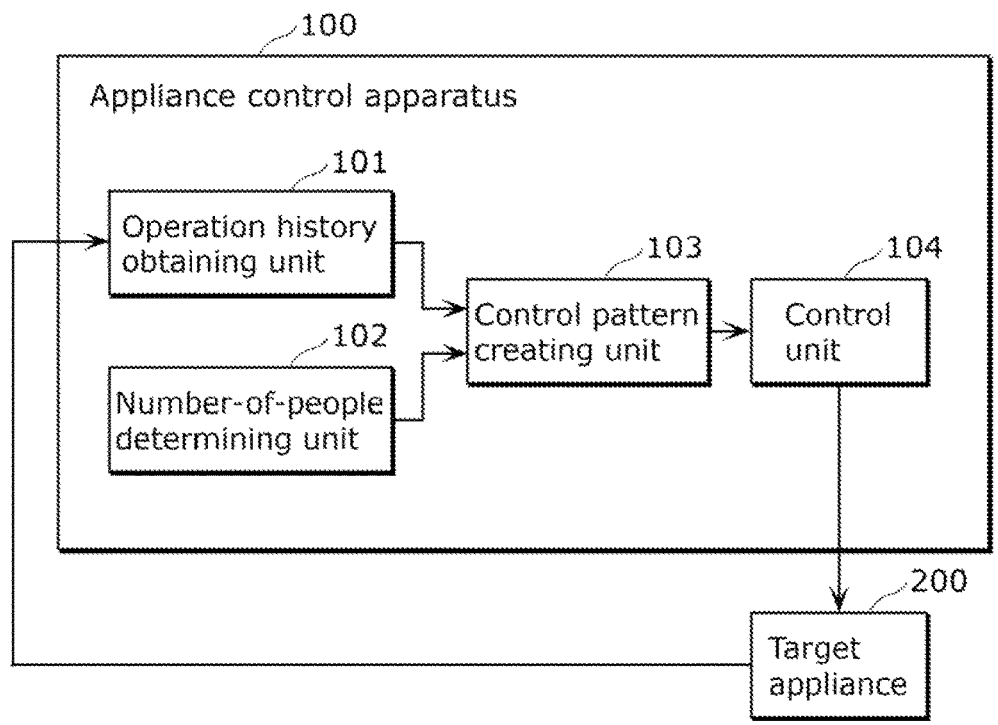
FIG. 1 depicts a block diagram showing a structure of an appliance control system according to Embodiment 1.

[Underlying Knowledge Forming Basis of the Present Invention]

When there is nobody in a building, a resident of the building disguises the building to look it as if there were some people therein in order to keep out an unauthorized intruder (such as a burglar). For example, the resident may keep a porch light on so that the building seemingly looks as if there were somebody therein. The resident may also use a timer to automatically turn on and off the power of an appliance (such as a light or an audio instrument) at a specific time so that the building seemingly looks as if there were somebody therein.

With such techniques, however, the light is always on even at midnight, and inevitably turns on and off at the same time. Hence, a pattern of a variation inside the building ends in monotonous for a person outside looks into the building. As a result, a person who tries to make an unauthorized intrusion will conduct preparatory studies on the building beforehand, so that he or she can easily find out when there is nobody in the building.

Thus, there is a proposed technique, such as the one disclosed in Patent Literature 1, to utilize operation information and time information of a home appliance to determine a control schedule for controlling the home appliance when there is nobody in the building.

However, the technique disclosed in Patent Literature 1 has a following problem: In the case where a control schedule is created based on operation information on an appliance when there are a few people in the building, the created control schedule could be inappropriate for preventing an unauthorized intrusion. For example, in the case where a control schedule is created based on operation information gathered when there was only one person in the building, the variation inside the building will end in monotonous even though the appliance is controlled according to the control schedule. As a result, a deterrent effect against the unauthorized intrusion will not be fully exercised.

Hence, an appliance control method according to an implementation of the present invention is for controlling a target appliance located in a building to disguise the number of people in the building. The method includes: obtaining an operation history of the target appliance; determining a change in the number of people in the building; creating, based on the operation history and the change in the number of people in the building, control patterns each of which is for controlling the target appliance and corresponds to a different one of the numbers of people including the number of people; selecting, from among the created control patterns each of which corresponds to a different one of the numbers of the people, a control pattern which corresponds to the predetermined virtual number of people; and controlling the target appliance according to the selected control pattern.

Such features make it possible to control a target appliance according to a control pattern corresponding to the virtual number of people. Hence, the appliance control method can disguise the number of people in the building as the virtual number of people, and appropriately control the appliance for disguising the number of people in the building. In the case where a large virtual number of people is set, for example, the target appliance is controlled based on an operation history obtained when there were a large number of people in the building. Such a feature contributes to making a significant change in the building and improving a deterrent effect against an unauthorized intrusion. In contrast, in the case where a small virtual number of people is set, the target appliance is controlled based on an operation history obtained when there were a small number of people in the building. Such a feature contributes to reducing power consumption.

For example, the creating may include creating the control patterns each of which corresponds to a different one of the numbers of the people, by associating an operation detail included in the operation history with the number of people in the building according to the change in the number of people in the building and an operation time included in the operation history.

Such a feature makes it possible to create a control pattern based on an operation time and an operation detail included in an operation history.

For example, the determining may include determining the change in the number of people in the building based on how frequently a user has carried out an operation, the frequency being obtained from the operation history.

Such a feature makes it possible to estimate a change in the number of people based on an operation history.

For example, the obtaining may include obtaining operation histories of target appliances located in the building, the creating may include creating control patterns each of which is for controlling the target appliances and corresponds to a different one of the numbers of the people, and the controlling may include controlling, according to the selected control pattern, only a target appliance included in the target appliances and located in a target zone which is at least one of zones that are created based on a layout of the building.

Such a feature makes it possible to control only a target appliance located in a target zone. Hence, the appliance control method places priority on the control of a target appliance located in a zone which is effective in the deterrence of an unauthorized intrusion. Such a feature contributes to more appropriate control of an appliance for disguising the number of people in the building. Moreover, the appliance control method eliminates the need for controlling a target appliance located in a zone which is less effective in the deterrence of an unauthorized intrusion. Such a feature contributes to reducing power consumption.

For example, the creating may include creating, for each of the zones, control patterns, each of which corresponds to a different one of the numbers of the people, based on (i) an operation history of a target appliance included in the target appliances and located in the zone and (ii) the change in the number of people in the building, and the selecting may include selecting a control pattern from among the control patterns each of which corresponds to a different one of the numbers of the people, the selected control pattern corresponding to the predetermined virtual number of the people and the target zone.

Such a feature makes it possible to create a control pattern for each of the zones. Hence, the feature makes it possible to create a control pattern suitable for the control of a target appliance located in each of the zones, and contributes to more appropriate control of an appliance for disguising the number of people in the building.

For example, the determining may include determining a change in the number of people in each of the zones, and the creating may include creating, for each of the zones, control patterns, each of which corresponds to a different one of the numbers of the people, based on (i) an operation history of a target appliance included in the target appliances and located in the zone, and (ii) change in the number of people in the zone.

Such a feature makes it possible to create a control pattern for each zone, based on a change in the number of people in the zone. Hence, the appliance control method can disguise the number of people in the building as the virtual number of people, and provide more appropriate control of an appliance for disguising the number of people in the building.

For example, the controlling may include controlling the target appliance in the case where the current number of people in the building is smaller than the predetermined virtual number of the people.

Such a feature can control a target appliance when the current number of people in the building is smaller than the virtual number of people. Hence, the appliance control method can automatically determine whether or not the control for deterring an unauthorized intrusion is necessary, and provide more appropriate control of an appliance for disguising the number of people in the building.

For example, the obtaining may include obtaining operation histories of target appliances located in the building, the creating may include creating control patterns each of which is for controlling the target appliances and corresponds to a different one of the numbers of people, the appliance control method may further include, in the case where the current number of the people in the building is larger than zero and smaller than the predetermined virtual number of the people, creating a complementary control pattern by extracting a control instruction from among control instructions included in the control pattern that corresponds to the virtual number of the people, the extracted control instruction being sent to a target appliance which is included in the target appliances and has not been operated for a predetermined period in the operation history, and, in the case where the virtual number of the people is larger than the current number of the people in the building, the controlling may include controlling the target appliances according to the complementary control pattern instead of the selected control pattern.

In the case where the current number of people in the building is (i) larger than zero and (ii) smaller than the virtual number of people, such a feature can create a complementary control pattern for controlling a target appliance which has not been operated during a predetermined period. Hence, the appliance control method can prevent a conflict between an operation by the user and control by the appliance control apparatus, which contributes to executing more appropriate appliance control for disguising the number of people in the building.

For example, the obtaining may include obtaining operation histories of appliances located in the building, and the determining may include determining the change in the number of people in the building based on a time interval between operations on the appliances and locations of the appliances, the operations being obtained from the operation histories.

Such a feature makes it possible to determine a change in the number of people in the building based on operation histories of multiple appliances. Thus, once the operation histories are obtained, the appliance control method can determine the change in the number of people in the building. This contributes to controlling the appliances in a simple structure.

For example, the appliance control method may include defining the locations of the appliances by (i) comparing the operation histories with a change of power supplied to each of areas in the building and (ii) defining an area, included in the areas, in which each of the appliances is located, wherein the determining may include determining the change in the number of people in the building based on the defined locations of the appliances.

Such a feature makes it possible to define locations of multiple appliances based on a change of power supplied to each of the areas. The feature eliminates the need for previously registering the appliances, which contributes to improving user-friendliness of the apparatus control method.

For example, the creating may include extracting an operation only from a time unit, among time units, indicating as many operations as a threshold or more, and, based on the extracted operation and the change in the number of people in the building, creating the control patterns each of which corresponds to a different one of the numbers of the people, the time units being included in the operation history and each having predetermined duration, and the control patterns each being created for a different one of the time units.

Such a feature makes it possible to create a control pattern based on an operation carried out in a time unit indicating as many operations as a threshold or more. Hence, the feature makes it possible to create a control pattern based on an operation history obtained when the target appliance is frequently operated. In other words, the feature can increase the activation level of a target appliance in the building, which contributes to improving a deterrent effect on an unauthorized intrusion.

It is noted that such a comprehensive and specific aspect may be implemented in the form of, or in a combined form of, a system, an apparatus, an integrated circuit, a computer program, and a storage medium such as a compact disc read only memory.

Described hereinafter are embodiments, with reference to the drawings.

It is nodded that all the after-described embodiments show comprehensive or specific examples. The numerical values, shapes, materials, constituent elements, locations and connecting schemes of the constitutional elements, steps, and an order of steps all described in the embodiments are examples, and shall not define claims. Hence, among the constituent elements in the embodiment, those not described in an independent claim representing the most generic concept of the present invention shall be described as arbitrary ones.

Embodiment 1

FIG. 1 depicts a block diagram showing a structure of an apparatus control system according to Embodiment 1. The appliance control system includes an appliance control apparatus 100 and a target appliance 200. The appliance control apparatus 100 and the target appliance 200 are connected with each other via a wired or wireless communications path, such as a local area network (LAN).

The target appliance 200 is placed at a building. An exemplary building is a house, an office, or a shop. The target appliance 200 can emit visible light or audible sound to a person outside the building. An exemplary target appliance 200 is a TV, an A/C, or a light. It is noted that the target appliance 200 does not have to be a home-use one; instead, the target appliance 200 may be a professional-use one.

The appliance control apparatus 100 controls the target appliance 200 and disguises the number of people in the building. In Embodiment 1, the appliance control apparatus 100 controls the target appliance 200 and disguises the number of people in the building, so that there were as if the virtual number of people in the building when there is nobody therein. As shown in FIG. 1, the appliance control apparatus 100 includes an operation history obtaining unit 101, a number-of-people determining unit 102, a control pattern creating unit 103, and a control unit 104.

The operation history obtaining unit 101 obtains an operation history of the target appliance 200. The operation history is the history of an operation which a user has carried out on the target appliance 200.

For example, the operation history obtaining unit 101 transmits, to the target appliance 200, a request message for requesting the transmission of operation history data at a predetermined time interval. Then, in response to the request message, the operation history obtaining unit 101 receives the operation history data from the target appliance 200.

In addition, for example, the appliance control apparatus 100 may receive operation history data which the target appliance 200 transmits by itself. Specifically, when the user operates the target appliance 200, the target appliance 200 may transmit, to the appliance control apparatus 100, data indicating the detail and time of the operation.

Here, the operation on the target appliance 200 is carried out by the user to change a control status of the target appliance 200. Moreover, in Embodiment 1, the control status shows, for example, a status of an appliance emitting visible light and audible sound to a person. In the case where the target appliance is, for example, an image displaying appliance, the control status indicates a power on/off, a volume, or a TV channel.

Furthermore, the operation history data shows an operation history. Specifically, for example, the operation history data includes at least one piece of operation data, such as an identifier for identifying the target appliance 200, the detail of an operation carried out on the target appliance 200, and the time when the operation was carried out (operation time). The operation data may further indicate a control status which is changed via an operation of the user.

It is noted that the operation history obtaining unit 101 does not necessarily have to directly obtain the operation history from the target appliance 200. For example, the operation history obtaining unit 101 may obtain the operation history from an apparatus which stores the operation history of the target appliance 200 but differs from the target appliance 200. Such an apparatus includes, for example, a network attached storage (NAS), a server, and a control terminal. Moreover, when the appliance control apparatus 100 transmits a control command to the target appliance 200 according to an instruction received from the user, the appliance control apparatus 100 may obtain the control command or the received instruction as the operation history.

The number-of-people determining unit 102 determines a change in the number of people in a building. The number of people in the building indicates how many people there are in the building. For example, the number-of-people determining unit 102 determines a change in the number of people in the building for a time unit at a predetermined interval.

More specifically, for example, the number-of-people determining unit 102 determines a change in the number of people in the building based on operation histories of multiple appliances including the target appliance 200. Furthermore, for example, the number-of-people determining unit 102 may determine a change in the number of people in the building based how frequently the user has carried out the operation, the frequency being obtained from the operation history. Moreover, for example, the number-of-people determining unit 102 may determine a change in the number of people in the building by analyzing an image taken inside the building. In addition, for example, the number-of-people determining unit 102 may determine a change in the number of people in the building based on an output signal sent from a motion sensor (not shown) placed at the front gate.

Based on the operation history and the change in the number of people in the building, the control pattern creating unit 103 creates control patterns each of which is for controlling the target appliance 200 and corresponds to a different one of the numbers of people. Specifically, based on an operation time included in the operation history and the change in the number of people in the building, the control pattern creating unit 103 creates controlling patterns each of which corresponds to a different one of the numbers of people by associating an operation detail included in the operation history with the number of people in the building. More specifically, for example, the control pattern creating unit 103 creates a control pattern for replicating the operation carried out within each of time units on the target appliance 200 in association for each time unit with the maximum number of people in the building in the time unit. To be more specific, in the case where the number-of-people determining unit 102 determines, for example, that there are three people in the building within a time unit, the control pattern creating unit 103 creates a control pattern corresponding to three people based on an operation carried out within the time unit.

Here, the control pattern is information including at least one control instruction for changing a control status of an appliance. For example, the control pattern includes at least one piece of control data. For example, the control data indicates an identifier for identifying the target appliance 200, a control instruction for changing a control status, and a time at which the instruction is to be executed.

It is noted that the control pattern creating unit 103 desirably creates multiple control patterns for each number of people. Hence, in disguising the number of people in the building, such a feature can add more variations in changes within the building, which contributes to improve a deterrent effect against an unauthorized intrusion.

In disguising the number of people in the building, the control unit 104 selects, from among control patterns each corresponding to a different one of the numbers of people, a control pattern which corresponds to the virtual number of people. When the number of virtual people is three, for example, the control unit 104 selects at least one control pattern corresponding to three people. It is noted that the virtual number of people may be previously set, for example, by the user. Moreover, for example, the virtual number of people may be automatically set based on crime information in the neighborhood of the building.

Furthermore, according to the above-selected control pattern, the control unit 104 controls the target appliance 200. Specifically, for example, the control unit 104 transmits, to the target appliance 200, a control instruction included in the selected control pattern and corresponding to the current time.

Described next are various operations of the above-structured appliance control apparatus 100.

Figure 2A:
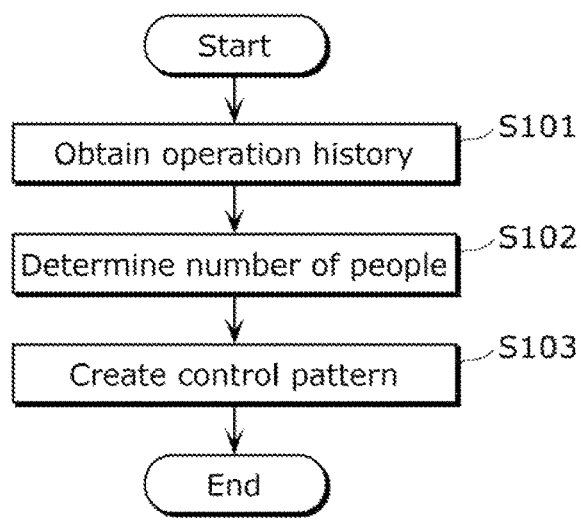
FIG. 2A depicts a flowchart showing how to create a control pattern for an appliance control apparatus according to Embodiment 1.
Figure 2B:
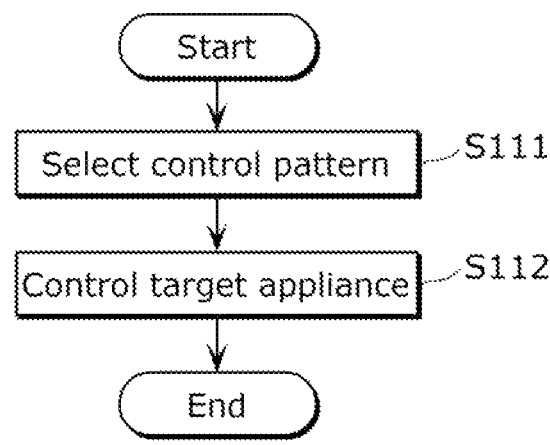
FIG. 2B depicts a flowchart showing how the appliance control apparatus according to Embodiment 1 controls an appliance.

FIG. 2A depicts a flowchart showing how to create a control pattern for the appliance control apparatus 100 according to Embodiment 1. The processing for creating a control pattern includes one for obtaining an operation history and determining the number of people. FIG. 2B depicts a flowchart showing how the appliance control apparatus 100 according to Embodiment 1 controls an appliance.

Described first is how to generate a control pattern, with reference to FIG. 2A.

The operation history obtaining unit 101 obtains an operation history (S101). Next, the number-of-people determining unit 102 determines a change in the number of people in the building (S102). Then, based on the operation history and the change in the number of people, the control pattern creating unit 103 creates control patterns each corresponding to a different one of the numbers of people (S103).

Described next with reference to FIG. 2B is how to control appliance in disguising the number of people in the building.

The control unit 104 selects, from among control patterns each corresponding to a different one of the numbers of people, a control pattern corresponding to the virtual number of people (S111). Then, according to the selected control pattern, the control unit 104 controls the target appliance 200 (S112).

As described above, the appliance control apparatus 100 according to Embodiment 1 can control a target appliance, according to a control pattern corresponding to the virtual number of people. Hence, the appliance control apparatus 100 can disguise the number of people in the building as the virtual number of people, and appropriately control the appliance to disguise the number of people in the building. In the case where a large virtual number of people is set, for example, the target appliance is controlled based on an operation history obtained when there were a large number of people in the building. Such a feature contributes to making a significant change in the building and improving a deterrent effect against an unauthorized intrusion. In contrast, in the case where a small virtual number of people is set, the target appliance is controlled based on an operation history obtained when there were a small number of people in the building. Such a feature contributes to reducing power consumption.

It is noted that, in Embodiment 1, described is the case where the appliance control system includes one target appliance; instead, the appliance control system may include multiple target appliances. In such a case, the appliance control apparatus 100 creates control patterns each of which is for controlling the target appliances and corresponds to a different one of the numbers of the people.

Embodiment 2

Described next is Embodiment 2. Embodiment 2 shows the case where multiple appliances are placed in a building.

Figure 3:
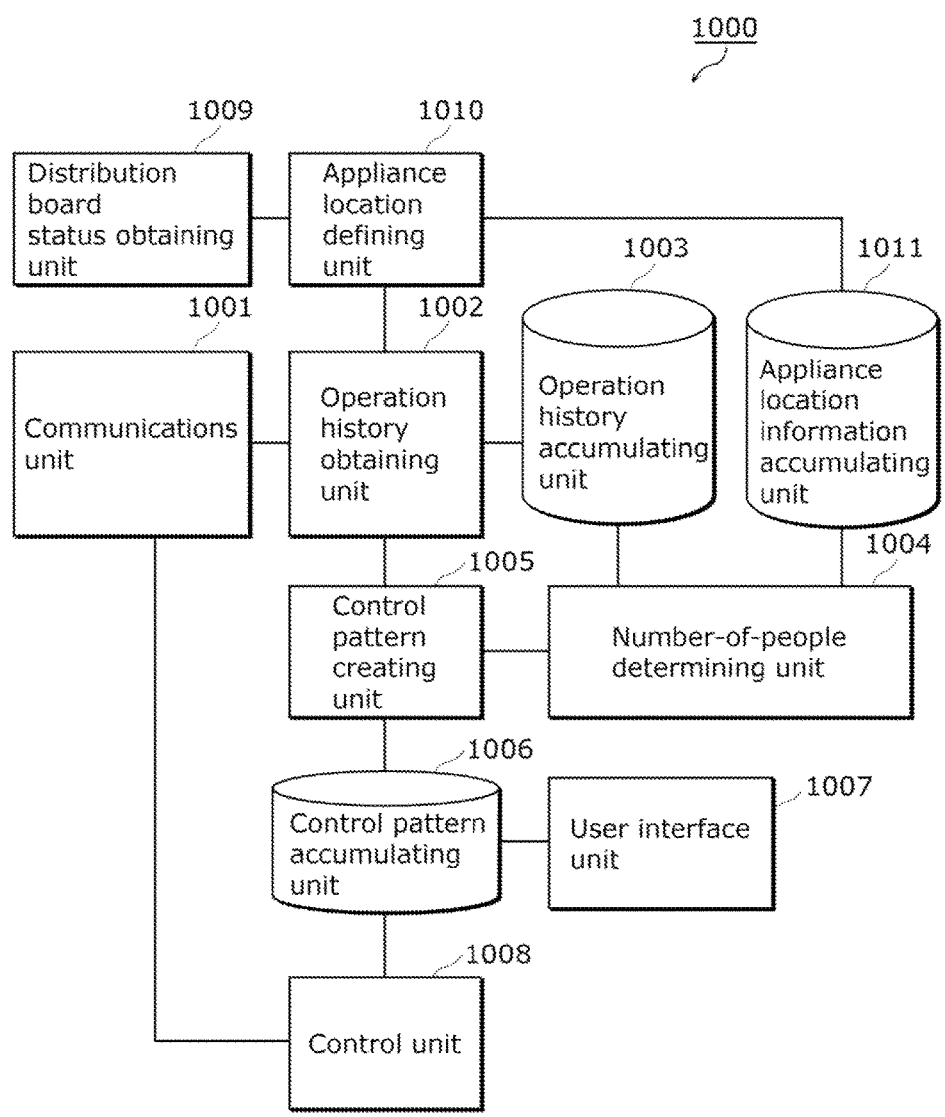
FIG. 3 depicts a block diagram showing a functional structure of an appliance control apparatus according to Embodiment 2.

FIG. 3 depicts a block diagram showing a functional structure of an appliance control apparatus 1000 according to Embodiment 2. As shown in FIG. 3, the appliance control apparatus 1000 includes a communications unit 1001, an operation history obtaining unit 1002, an operation history accumulating unit 1003, a number-of-people determining unit 1004, a control pattern creating unit 1005, a control pattern accumulating unit 1006, a user interface unit 1007, a control unit 1008, a distribution board status obtaining unit 1009, an appliance location defining unit 1010, and an appliance location information accumulating unit 1011.

The communications unit 1001 holds communications with multiple appliances. In Embodiment 2, the communications unit 1001 holds communications with multiple appliances using communications techniques such as, for example, a wireless LAN, Bluetooth (Registered), ECHO-NET, and infrared data communications.

The operation history obtaining unit 1002 collects operation histories from the appliances via the communications unit 1001. The operation history obtaining unit 1002 stores, in the operation history accumulating unit 1003, the collected operation histories as operation history data.

The operation history accumulating unit 1003 is a storage apparatus such as a semiconductor memory or a hard disc drive. The operation history accumulating unit 1003 stores the operation history data obtained by the operation history obtaining unit 1002. In Embodiment 2, the operation history data indicates a control status of an appliance (such as on/off of a light, or channel or volume of TV), in addition to the detail and the time of an operation by the user of the appliance.

The number-of-people determining unit 1004 determines a change in the number of people in a building, based on a time interval between operations of appliances and locations of the appliances.

The control pattern creating unit 1005 creates a control pattern for each of the numbers of the people, based on an operation history for at least one day, and a change in the number of people found in the building and corresponding the operation history. The control pattern creating unit 1005 stores the created control pattern in the control pattern accumulating unit 1006.

The control pattern accumulating unit 1006 is a storage apparatus such as a semiconductor memory or a hard disc drive. The control pattern accumulating unit 1006 accumulates a control pattern created by the control pattern creating unit 1005.

The user interface unit 1007 receives from the user an input of at least the virtual number of people. In Embodiment 2, the user interface unit 1007 further receives from the user an input of a target zone.

The control unit 1008 selects from the control pattern accumulating unit 1006 a control pattern corresponding to the virtual number of people and the target zone. Then, according to the selected control pattern, the control unit 1008 controls a target appliance.

The distribution board status obtaining unit 1009 obtains an amount of current flowing through each of breakers provided to a distribution board. Through each of the breakers, power is supplied to areas in the building. Each area corresponds to a different one of the breakers. Specifically, each of the breakers is electrically connected to a socket provided in an area. In other words, the distribution board status obtaining unit 1009 obtains a change of power supplied to each of the areas in the building.

The appliance location defining unit 1010 defines locations of the appliances in the building. For example, based on previously registered position information or position information obtained through communications between each of the appliances, the appliance location defining unit 1010 defines the locations of the appliances.

Furthermore, for example, the appliance location defining unit 1010 may define the locations of the appliances by comparing a change of the power supplied to each of the areas in the building with a change of a control status of each of the appliances to be obtained from an operation history and defining an area in which each of the appliances is located. Specifically, the appliance location defining unit 1010 compares a change in an amount of current in each breaker and a change of a control status of each of the appliances to define a breaker corresponding to each appliance, and defines the locations of the appliances.

Moreover, the appliance location defining unit 1010 stores, in the appliance location information accumulating unit 1011, appliance location information indicating the defined locations of the appliances.

The appliance location information accumulating unit 1011 is a storage apparatus such as a semiconductor memory or a hard disc drive. The appliance location information accumulating unit 1011 accumulates the appliance location information indicating the locations of the appliances defined by the appliance location defining unit 1010.

Such features allow the appliance control apparatus 1000 to disguise the number of people in the building, so that, when a person looks inside the building from outside, there were as if the virtual number of people in the building regardless of the actual number of people in the building.

Figure 4:
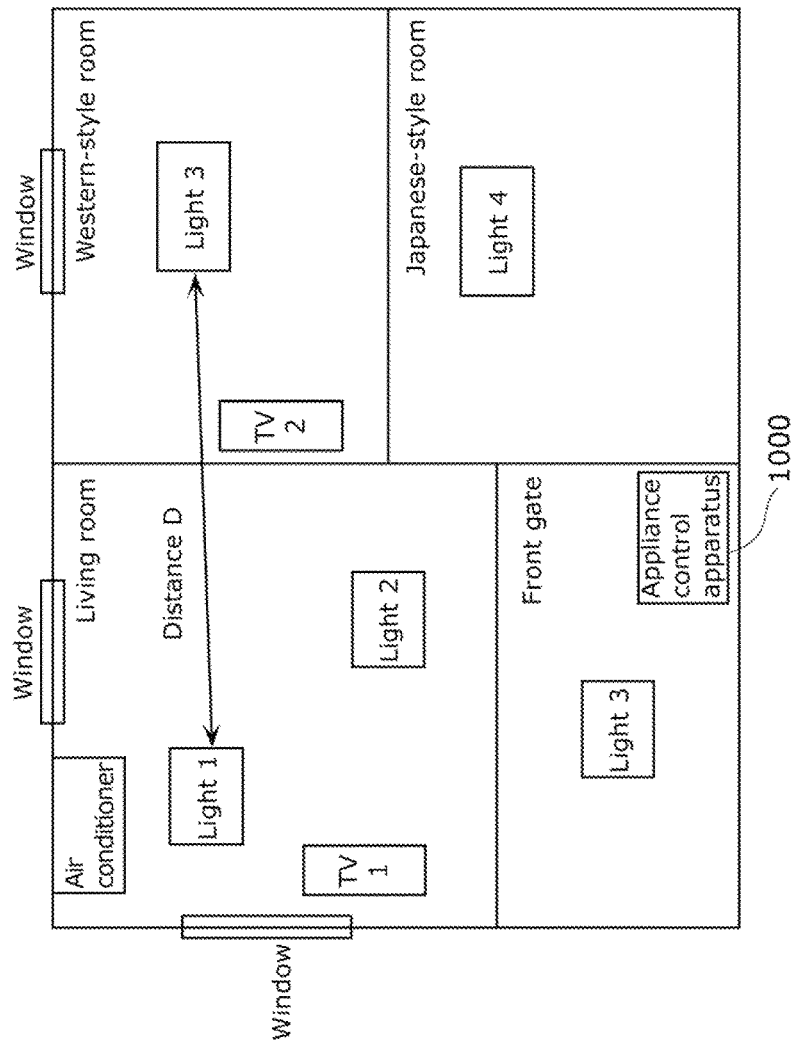
FIG. 4 exemplifies a location of appliances in a building according to Embodiment 2.

Described hereinafter is a relationship between operations of appliances and the number of people in the building, with reference to FIG. 4. FIG. 4 exemplifies a location of appliances in a building according to Embodiment 2.

FIG. 4 shows that lights 1 and 3 are distantly apart each other, and the TVs 1 and 2 are also distantly apart each other. For example, suppose there is a distance of five meters between a position for operating (hereinafter referred to as "operation position") the light 1 and an operation position of the light 3. Here, in the case where a person walks at the speed of 0.5 m/s, it takes 10 seconds for the user to move from the operation position of the light 1 to that of the light 3. It is noted that, hereinafter, the operation position may also be referred to as a position of an appliance.

Hence, in the case where a time interval between the operation of the light 1 and that of the light 3 is 10 seconds or shorter, the number-of-people determining unit 1004 can determine that there were at least two people or more in the building when the lights 1 and 3 were operated. Similarly, also for a TV and other lights, the number-of-people determining unit 1004 can determine the number of people in the building by comparing the distance between their operation positions with an operation interval. Furthermore, in the case where three or more appliances are operated within a time period defined by the distance between the operation positions of the appliances, the number-of-people determining unit 1004 can determine that there are as many people as or more people than the number of the appliances.

In other words, in the case where at least two operations indicated in an operation history are carried out within a time period to be determined by the distance between operation positions, the number-of-people determining unit 1004 can determine the number of operations as the number of people in the building. Then, based on the number of people determined for each operation, the number-of-people determining unit 1004 can determine a change in the number of people in the building.

Described next are various operations of the above-structured appliance control apparatus 1000.

Figure 5:
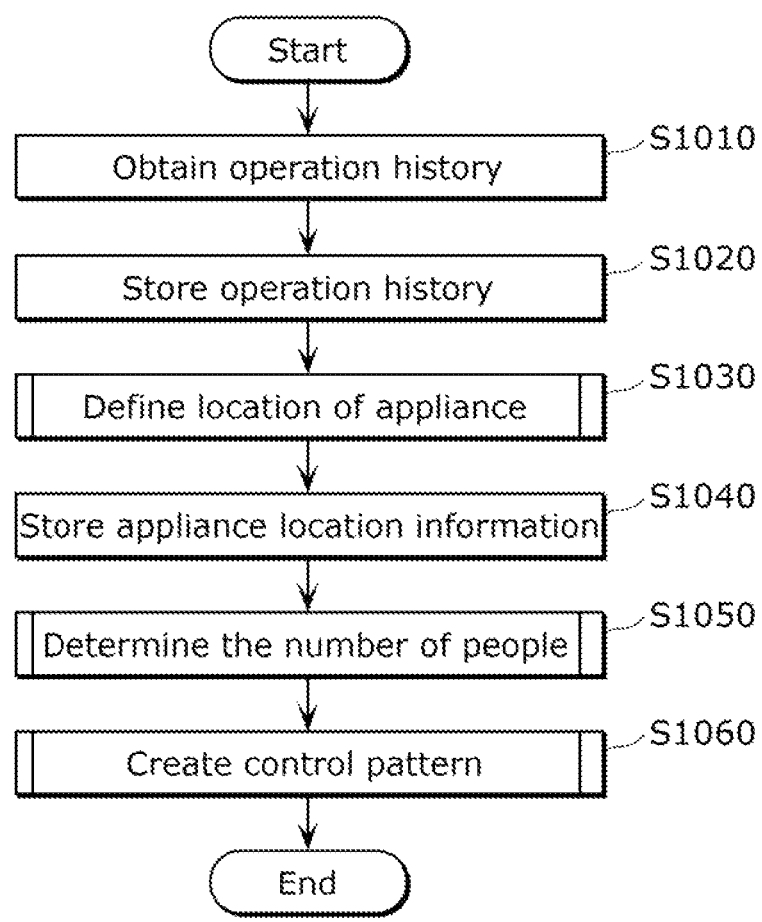
FIG. 5 depicts a flowchart showing how to create a control pattern for the appliance control apparatus according to Embodiment 2.

FIG. 5 depicts a flowchart showing how to create a control pattern for the appliance control apparatus 1000 according to Embodiment 2.

First, through communications unit 1001, the operation history obtaining unit 1002 receives operation history data of multiple appliances provided in a building (S1010). The operation history data may include a parameter indicating channel switching and lighting luminance, as well as a parameter indicating an ON/OFF state of the power of each appliance. The operation history data includes, for example, an operation history of a remote control and a switch used by the user.

The operation history obtaining unit 1002 stores the operation history data in the operation history accumulating unit 1003 (S1020). As shown in FIG. 6, the includes such information as "appliance" for identifying an appliance, "time and date" for indicating an operation time, "operation detail" indicating the detail of an operation, and "control status" indicating how the status of an appliance changed after the operation. Moreover, the operation history data includes information "estimated number of people" indicating the number of people in the building corresponding to an operation. The information indicating the number of people is registered after the number-of-people determining unit 1004 determines the number of people in the building.

It is noted that the operation history data may additionally include day-of-the-week information. Such a feature allows the appliance control apparatus 1000 to obtain operation histories classified according to day of the week. This is effective for a user whose life style is different each day.

Next, the appliance location defining unit 1010 defines a location of the appliances (S1030). The processing shall be detailed later, with reference to FIG. 7. The appliance location defining unit 1010 stores, in the appliance location information accumulating unit 1011, information indicating the locations of the defined appliances as appliance location information (S1040).

Next, the number-of-people determining unit 1004 determines a change in the number of people in the building (S1050). The processing shall be detailed later, with reference to FIG. 10.

Finally, the control pattern creating unit 1005 creates a control pattern (S1060). The processing shall be detailed later, with reference to FIG. 11.

Figure 7:
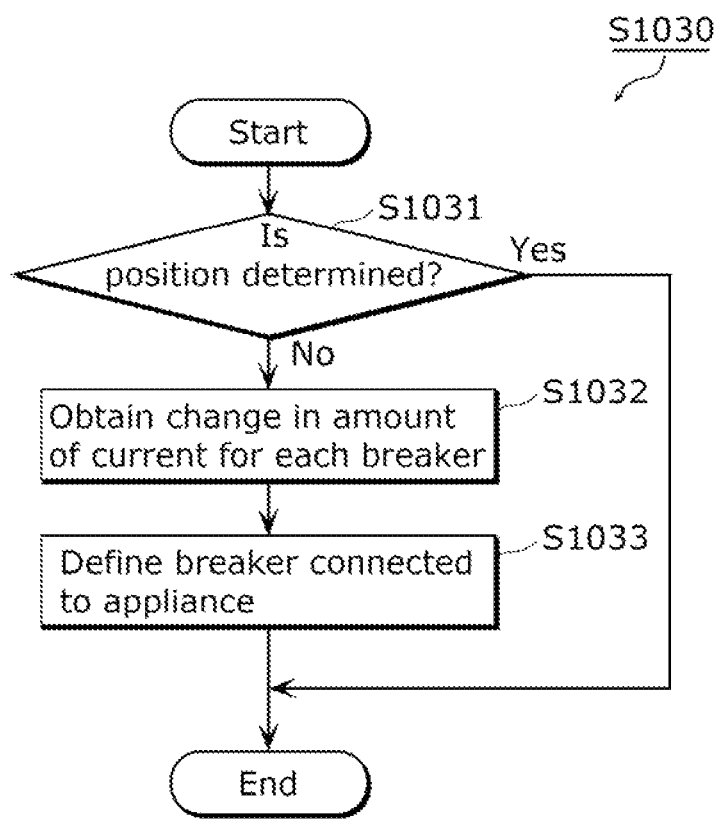
FIG. 7 depicts a flowchart showing a processing operation of an appliance location defining unit according to Embodiment 2.

Described here is how the appliance location defining unit 1010 defines the locations of the appliances in Step S1030, with reference to FIGS. 7 to 9.

FIG. 7 depicts a flowchart showing a processing operation of the appliance location defining unit 1010 according to Embodiment 2. FIG. 8 shows the processing operation of the appliance location defining unit 1010 according to Embodiment 2. FIG. 9 exemplifies appliance location information according to Embodiment 2.

As shown in FIG. 7, the appliance location defining unit 1010 first determines whether or not the position of each appliance is determined (S1031). For example, the appliance location defining unit 1010 determines that the position of each appliance is determined in the case where the appliance location information accumulating unit 1011 accumulates, with previous setting performed by the user, information indicating the position of each appliance (such as (i) coordinates derived from position information designating the front gate as the origin (0,0,0), (ii) coordinates (X,Y,Z) based on the latitude and longitude information, and (iii) the name of a room). Here, in the case where the position of each appliance is defined (S1031: Yes), the appliance location defining unit 1010 ends the processing.

In contrast, in the case where the position of each appliance is not defined (S1031: No), the appliance location defining unit 1010 obtains from the distribution board status obtaining unit 1009 a change in the amount of a current flowing each of the breakers provided to the distribution board (S1032). The appliance location defining unit 1010 compares the timing when the amount of a current changes at each breaker with the timing when each appliance is operated, and defines which appliance is connected to which breaker (S1033). Hence, the appliance location defining unit 1010 defines a breaker to which each appliance is connected, and defines the locations of the appliances.

For example, as shown in FIG. 8, in the case where there is an increase in the amount of the current at the second breaker at the time when the user turns on the light 1, it is the light 1 that is defined to be connected to the second breaker. The information indicating the second breaker defined above is accumulated in the appliance location information accumulating unit 1011 as information indicating the position of the light 1. As shown in FIG. 9, the appliance location information includes at least one of the coordinate information, the room information, and the breaker information for each appliance.

Figure 10:
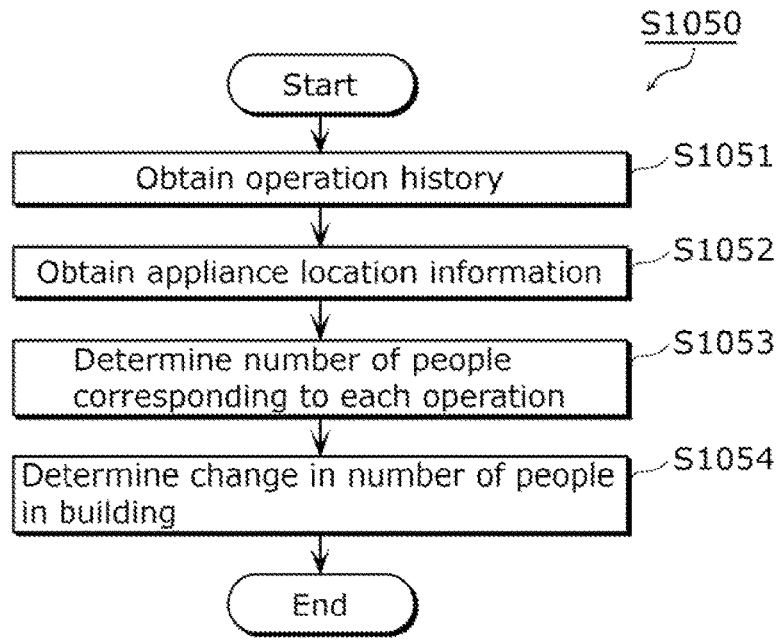
FIG. 10 depicts a flowchart showing a processing operation of a number-of-people determining unit according to Embodiment 2.

Described next is how the number-of-people determining unit 1004 determines in Step S1050 a change in the number of people in the building, with reference to FIG. 10. FIG. 10 depicts a flowchart showing a processing operation of the number-of-people determining unit 1004 according to Embodiment 2.

First, the number-of-people determining unit 1004 obtains operation history data from the operation history accumulating unit 1003 (S1051). Next, the number-of-people determining unit 1004 obtains appliance location information from the appliance location information accumulating unit 1011 (S1052).

Then, based on the operation history, the number-of-people determining unit 1004 determines the number of people corresponding to each of the operations (S1053). Specifically described below is how the number-of-people deter mining unit 1004 determines the number of people in the building corresponding to each operation.

First, based on the appliance location information, the number-of-people determining unit 1004 determines a distance between appliances. To be exact, the distance between rooms differs from that between appliances; however, the number-of-people determining unit 1004 determines, for example, a distance between the centers of the rooms in which the appliances are located as the distance between the appliances.

Moreover, for example, in the case where each of the appliances is located in a different room, the number-of-people determining unit 1004 may determine a previously set distance (five meters, for example) as the distance between the appliances. In addition, for example, in the case where each of the appliances is connected to a different breaker, the number-of-people determining unit 1004 may determine a previously set distance (three meters, for example) as the distance between the appliances.

With reference to each of the operation times using an operation history, the number-of-people determining unit 1004 obtains a time interval between operations of different appliances with each other. Then, based on the time interval and the distance between the appliances, the number-of-people determining unit 1004 finds out an operation which cannot be carried out unless there are two or more people in the building, and determines the number of people in the building corresponding to each of the operations.

For example, in the case where three appliances located three meters apart from one another are operated within 10 seconds, the number-of-people determining unit 1004 can determine that three is the number of people corresponding to the operations.

Specifically, for example, the number-of-people determining unit 1004 counts an operation which satisfies the condition of "D×K1>T" out of all the operations. Here, D represents a distance between the appliances. T represents a time interval between the operations and indicates temporal proximity. K1 is a coefficient based on, such as, a walking speed of a person.

For example, in the case where there are appliances located five meters apart each other and operated at a six-second time interval (D=5 and T=6), and K1=2 is given, the case satisfies the above condition (5 m×2>6 sec). Hence, the number-of-people determining unit 1004 determines two ore more as the number of people corresponding to the operations.

Thus, the number-of-people determining unit 1004 can determine the number of people in the building corresponding to each of the operations.

Next, based on the number of people in the building corresponding to each operation, the number-of-people determining unit 1004 determines a change in the number of people in the building (S1054). Specifically, for example, the number-of-people determining unit 1004 determines, for each of the operations, the change in the number of the building on the condition that there was the number of people corresponding to each operation during a predetermined time period including the operation time. Here, in the case where multiple time periods each corresponding to a different one of multiple operations overlap each other, the number-of-people determining unit 1004 determines the change in the number of people in the building so that the largest number of people is the overlapping number of people.

As described above, the number-of-people determining unit 1004 can determine the change in the number of people in the building.

Described next is how the control pattern creating unit 1005 creates a control pattern in Step S1060 with reference to FIGS. 11 to 13.

Figure 11:
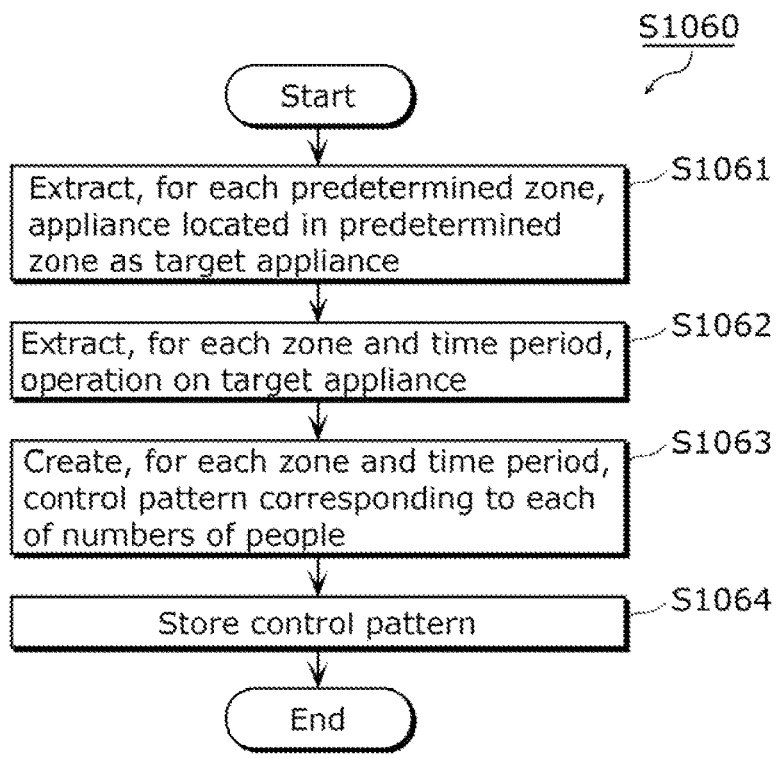
FIG. 11 depicts a flowchart showing a processing operation of a control pattern creating unit according to Embodiment 2.

FIG. 11 depicts a flowchart showing a processing operation of the control pattern creating unit 1005 according to Embodiment 2. FIG. 12 exemplifies zones according to Embodiment 2. FIG. 13 exemplifies a control pattern according to Embodiment 2.

As shown in FIG. 11 the control pattern creating unit 1005 extracts, for each of predetermined zones, an appliance located in the predetermined zone as a target appliance (S1061).

Figure 12:
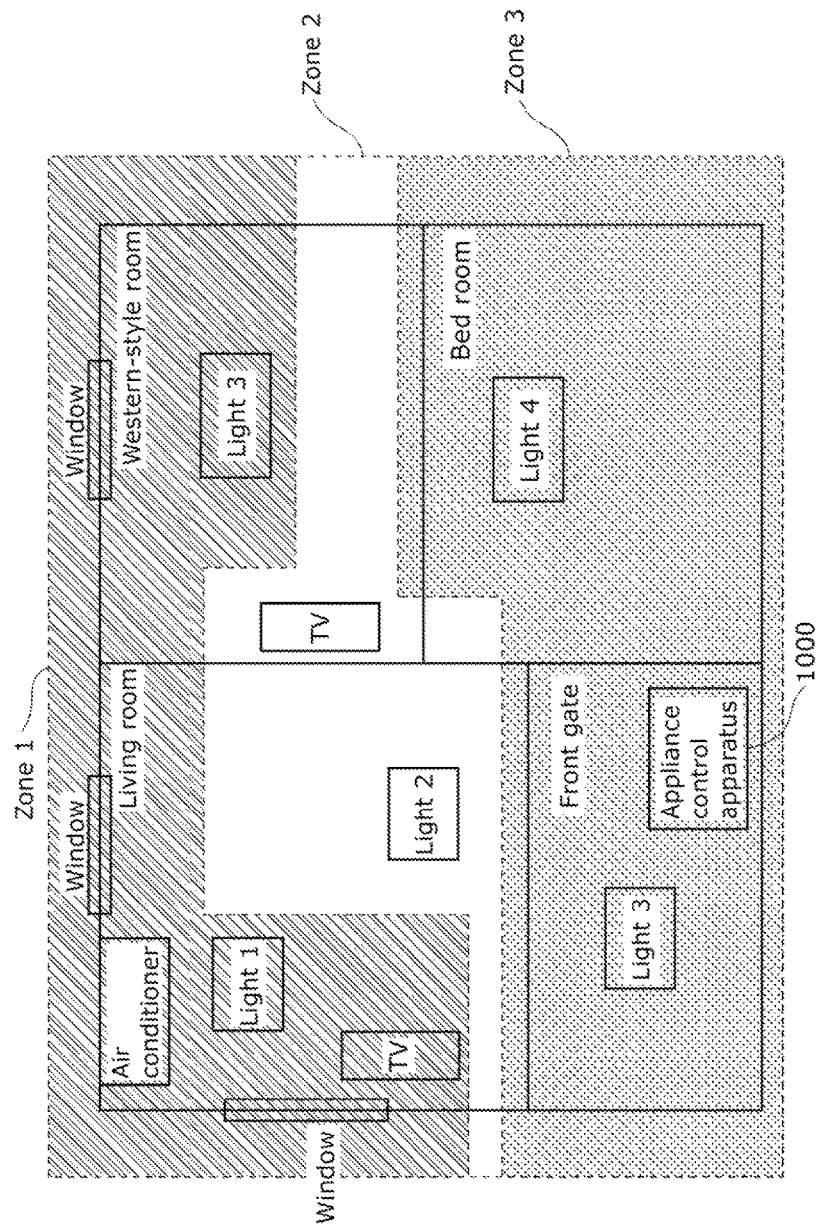
FIG. 12 exemplifies zones according to Embodiment 2.

Described here is a zone, with reference to FIG. 12. As shown in FIG. 12, the building includes two kinds of zones: one is visible from outside of the building, and the other is hard to be seen from outside of the building.

In the building, for example, there is a zone which is hardly seen from outside of the building, such as a room with no window (Zone 3 in FIG. 12). An appliance located in such a hardly-seen zone is not effective as a target appliance for disguising the number of people in the building.

Moreover, for example, there is another zone which is hard to be seen from outside of the building (Zone 2 in FIG. 12). The hard-to-be-seen zone includes, for example, an area in a room with a window and apart from the window. An appliance located in such a hard-to-be-seen zone is more effective than the appliance located in the hardly-seen zone as a target appliance for disguising the number of people in the building.

Furthermore, for example, there is still another zone which is visible from outside of the building (Zone 1 in FIG. 12). An appliance located in such a visible zone is most effective as a target appliance for disguising the number of people in the building.

The zones arranged above are previously set by the user, for example. In addition, for example, the zones may be automatically set based on the layout of the building.

Next, for each zone and time unit having predetermined duration and for each zone, the control pattern creating unit 1005 extracts, from an operation history, an operation on the target appliance (S1062). Specifically, for each zone, the control pattern creating unit 1005 extracts an operation from the operation history for every one-hour time unit (18:00 to 19:00, for example).

Here, for example, the control pattern creating unit 1005 may extract the operation only from a time unit included in multiple time units and showing as many operations as a threshold or more. Such a feature allows the control pattern creating unit 1005 to create a control pattern based on an operation history obtained when the target appliance is frequently operated. This contributes to making a significant change in the building. In other words, the feature can increase the activation level of a target appliance in the building, which contributes to improving a deterrent effect on an unauthorized intrusion.

It is noted that the threshold may be previously set, depending on the number of people in the building. Specifically, the threshold may be set greater as the number of people in the building is larger. More specifically, the threshold may be, for example, the same as the number of people in the building. Such a feature contributes to appropriately creating a control pattern, depending on to what degree the user expects an unauthorized intrusion to be deterred.

Next, based on the extracted operation, the control pattern creating unit 1005 creates, for each time unit and zone, a control pattern corresponding to each of the numbers of the people (S1063). Specifically, for example, the control pattern creating unit 1005 creates for each time unit and zone a control pattern for replicating the operation extracted from the time unit, in association with the largest number of people in the building within the time unit.

Finally, the control pattern creating unit 1005 stores the created control patterns, each associated with one of the numbers of people, in the control pattern accumulating unit 1006 (S1064). For example, the control pattern accumulating unit 1006 accumulates the control patterns shown in FIG. 13.

As described above, for each of the zones, the control pattern creating unit 1005 creates control patterns each corresponding to a different one of the numbers of people based on an operation history of a target appliance located in the zone, and the change in the number of people in the building.

Described next is how to control a target appliance in disguising the number of people in the building, with reference to FIGS. 14 and 15.

Figures 13, 14:
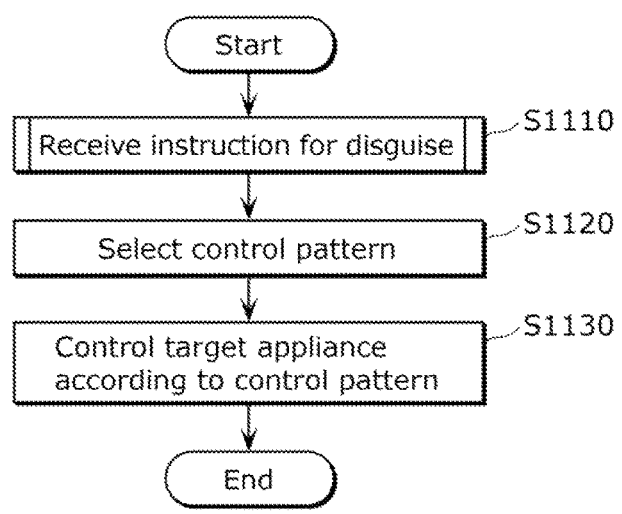
FIG. 13 exemplifies a control pattern according to Embodiment 2.
FIG. 14 depicts a flowchart showing how the appliance control apparatus according to Embodiment 2 controls an appliance.

FIG. 14 depicts a flowchart showing how the appliance control apparatus 1000 according to Embodiment 2 controls an appliance.

As shown in FIG. 14, the user interface unit 1007 receives an instruction for disguise from the user (S1110). The processing shall be detailed later, with reference to FIG. 15.

Next, based on the instruction for disguise, the control unit 1008 selects a control pattern (S1120). Specifically, from among control patterns each corresponding to a different one of the numbers of people, the control unit 1008 selects a control pattern corresponding to the virtual number of people and to a target zone.

Finally, according to the selected control pattern, the control unit 1008 controls a target appliance (S1130). In other words, according to the selected control pattern, the control unit 1008 controls only a target appliance included in multiple target appliances and located in a target zone. More specifically, according to a control pattern in a time unit corresponding to the current time, the control unit 1008 controls a target appliance included in multiple target appliances and located in a target zone.

Here, in the case where multiple control patterns in multiple time units are used, control instructions included in the control patterns may be adjusted so that no inconsistency occurs among the control patterns. For example, when a control instruction for power-on is transmitted to a target appliance according to the control pattern in a first time unit, the transmission of another control instruction may be canceled, the other control instruction being included in a second time unit following the first control unit and sent to the target appliance for power-on.

Described next is how the user interface unit 1007 receives an instruction for disguise from the user in Step S1110, with reference to FIG. 15. FIG. 15 depicts a flowchart showing a processing operation of the user interface unit 1007 according to Embodiment 2.

First, the user interface unit 1007 displays a screen for selecting the disguise number of people (S1111). Here, in the case where no disguise number of people is selected (S1112: No), the user interface unit 1007 stands by until the disguise number of people is selected. In contrast, in the case were the disguise number of people is selected (S1112: Yes), the user interface unit 1007 displays a screen for selecting a target zone (S1113).

In the case where no target zone is selected (S1114: No), the user interface unit 1007 stands by until a target zone is selected. In contrast, in the case where a target zone is selected (S1114: Yes), the user interface unit 1007 sets the selection result as an instruction for disguise (S1115).

As described above the appliance control apparatus 1000 according to Embodiment 2 can control only a target appliance located in a target zone. Hence the appliance control apparatus 1000 places priority on the control of a target appliance located in a zone which is effective in the deterrence of an unauthorized intrusion. Such a feature contributes to more appropriate control of an appliance for disguising the number of people in the building. Moreover, the appliance control apparatus 1000 eliminates the need for controlling a target appliance located in a zone which is less effective in the deterrence of an unauthorized intrusion. Such a feature contributes to reducing power consumption.

For example, in simply using an operation history to create a control pattern, it is only the target appliances located in an invisible zone from outside of the building that would be controlled. In such a case, an unauthorized intrusion cannot necessarily be effectively deterred. In contrast, in Embodiment 2, the appliance control apparatus 1000 can control a target appliance located in a visible zone from outside of the building. This contributes to improving the effect of deterring an unauthorized intrusion.

Moreover, in disguising the number of people in the building, the user selects the virtual number of people and a target zone. Thus, the user can select an appropriate control pattern, considering a balance between an effect of deterring an unauthorized intrusion and power consumption. In other words, the appliance control apparatus 1000 according to Embodiment 2 allows the user to easily select a control pattern, which contributes to improving user-friendliness of the apparatus.

[Modification of Embodiment 2]

Described next is Modification of Embodiment 2. Modification differs from Embodiment 2 in that the former involves determining a change in the number of people for each zone, and creating a control pattern based on the change. Described hereinafter is Modification with a focus on its differences from Embodiment 2.

Figure 15:
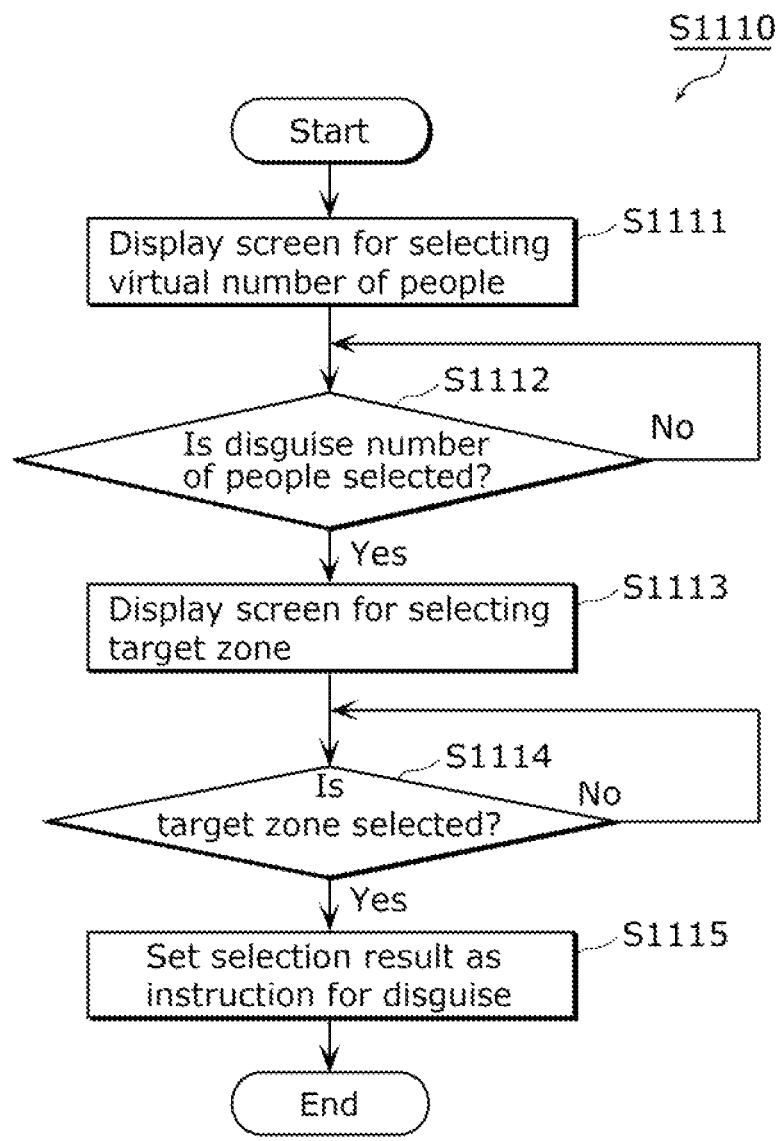
FIG. 15 depicts a flowchart showing a processing operation of a user interface unit according to Embodiment 2.
Figure 16:
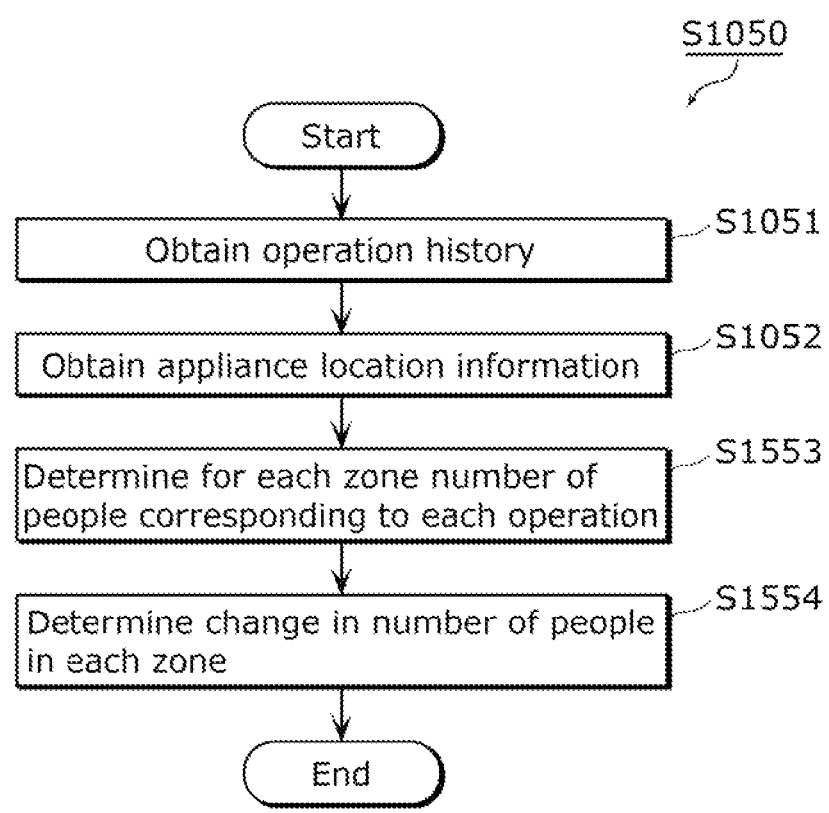
FIG. 16 depicts a flowchart showing a processing operation of the number-of-people determining unit in a modification according to Embodiment 2.

FIG. 15 depicts a flowchart showing a processing operation of the number-of-people determining unit 1004 according to Modification of Embodiment 2. It is noted that, in FIG. 16, the steps for the processing similar to that in FIG. 10 share the same numeral references as those in FIG. 10, and the details thereof shall be omitted.

Then, for each zone, the number-of-people determining unit 1004 determines the number of people corresponding to each of the operations (S1553). In other words, for each zone, the number-of-people determining unit 1004 determines the number of people corresponding to each operation based on (i) a time interval between operations of appliances located in the zone and different each other, and (ii) the distance between the appliances in the zone.

Next, the number-of-people determining unit 1004 determines a change in the number of people in each of the zones (S1554). Specifically, the number-of-people determining unit 1004 determines the change in the number of people in each zone, based on the number of people in the building corresponding to each of the operations for each zone.

Based on the determined change in the number of people in each zone, the control unit 1008 creates a control pattern corresponding to each of the numbers of the people. Specifically, for each of the zones, the control unit 1008 creates control patterns each corresponding to a different one of the numbers of the people based on an operation history of a target appliance located in the zone and the change in the number of people in the zone.

As described above, the appliance control apparatus 1000 according to Modification can create a control pattern for each zone based on a change in the number of people in the zone. Hence, the appliance control apparatus 1000 can disguise the number of people in the building as the virtual number of people, and appropriately control an appliance for disguising the number of people in the building.

Embodiment 3

Described next is Embodiment 3. Embodiment 3 differs from Embodiment 2 in that the former creates a complementary control pattern when there is a person in the building. Described hereinafter is Embodiment 3 with a focus on its differences from Embodiment 2.

Figure 17:
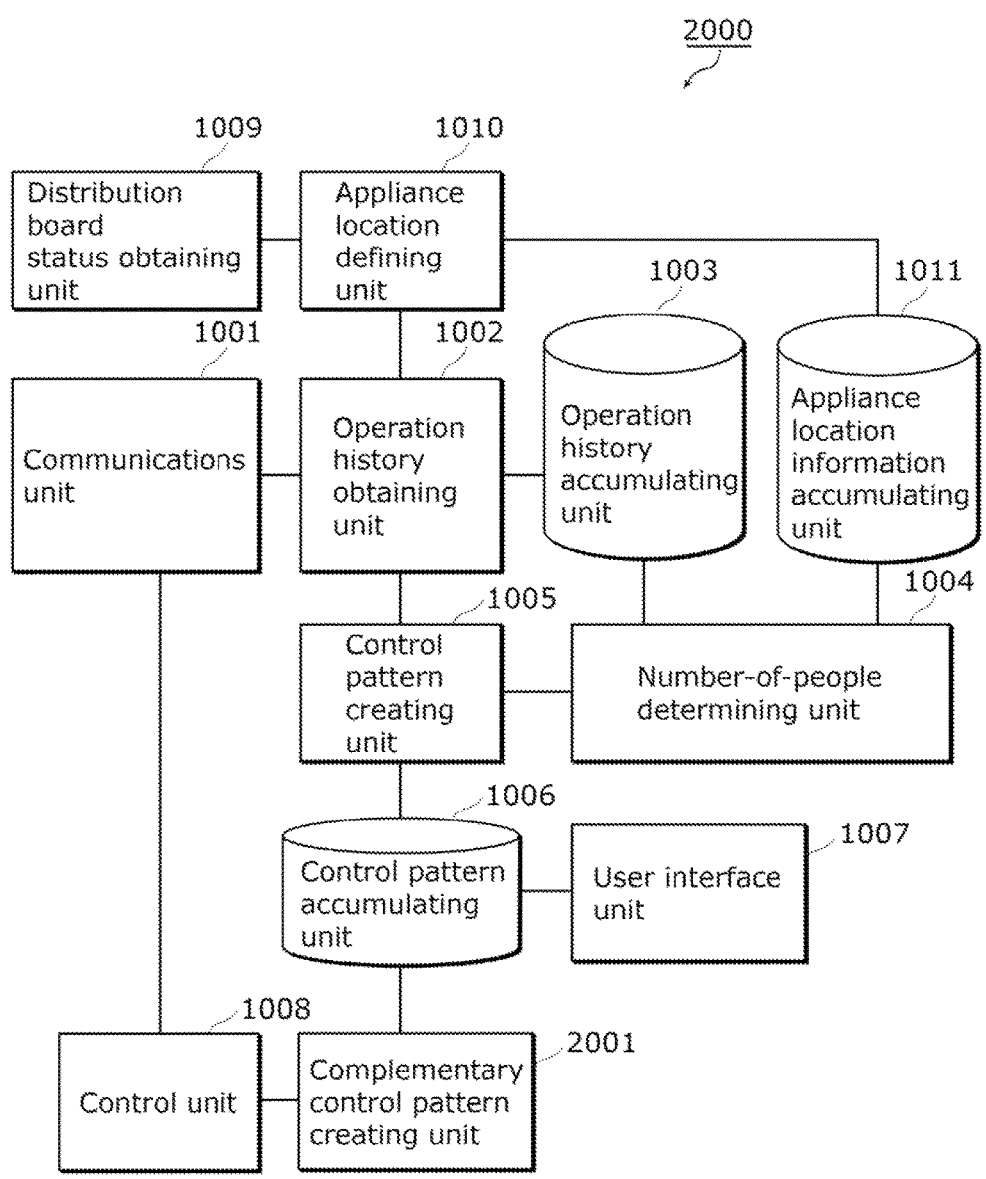
FIG. 17 depicts a block diagram showing a functional structure of an appliance control apparatus according to Embodiment 3.

FIG. 17 depicts a block diagram showing a functional structure of an appliance control apparatus 2000 according to Embodiment 3. It is noted that, in FIG. 17, the constituent elements similar to the ones in FIG. 3 share the same numeral references as those therein, and the details thereof shall be omitted.

The appliance control apparatus 2000 according to Embodiment 3 further includes a complementary control pattern creating unit 2001.

In the case where the current number of people in a building is larger than zero and smaller than the virtual number of people, the complementary control pattern creating unit 2001 creates a complementary control pattern by extracting a control instruction from among control instructions included in the control pattern that corresponds to the virtual number of people. Here, the extracted control instruction is sent to a target appliance which has not been operated for a predetermined period in an operation history. The predetermined period may be appropriately set based on experience and experiment.

When the complementary control pattern is created, the control unit 1008 controls a target appliance according to the created complementary control pattern.

Described next are various operations of the appliance control apparatus 2000. It is noted that how to create a control pattern for the appliance control apparatus 2000 is similar to that described in Embodiment 2. Thus, the drawings and details thereof shall be omitted.

Figure 18:
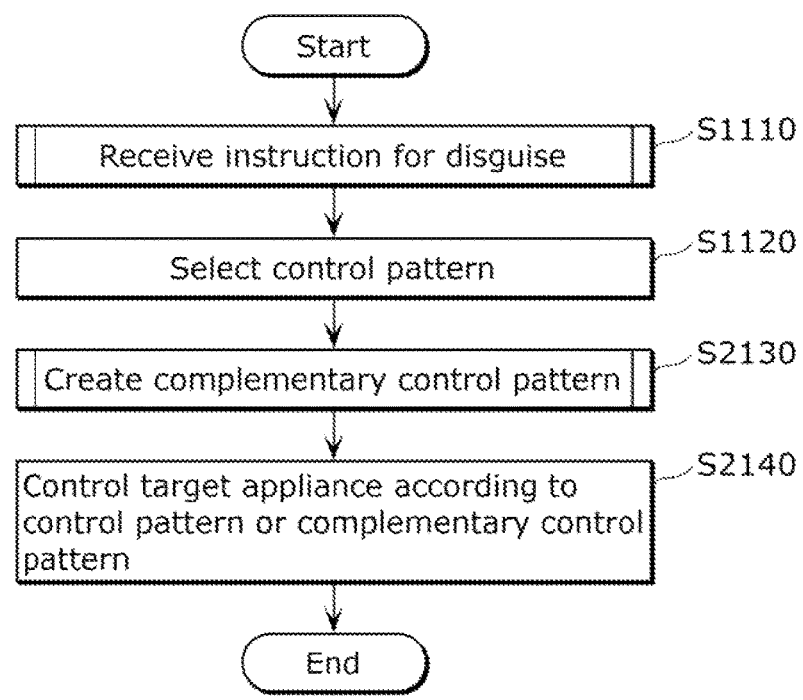
FIG. 18 depicts a flowchart showing how the appliance control apparatus according to Embodiment 3 controls an appliance.

FIG. 18 depicts a flowchart showing how the appliance control apparatus according to Embodiment 3 controls an appliance. It is noted that, in FIG. 18, the steps for the processing similar to that in FIG. 14 share the same numeral references as those in FIG. 14, and the details thereof shall be omitted.

The complementary control pattern creating unit 2001 creates a complementary control pattern when a predetermined condition is satisfied (S2130). The processing shall be detailed later, with reference to FIG. 18.

Next, according to a control pattern or a complementary control pattern, the control unit 1008 controls a target appliance (S2140). Specifically, when the complementary control pattern is created in Step S2130, the control unit 1008 controls the target appliance according to the created complementary control pattern. In contrast, when no complementary control pattern is created in Step S2130, the control unit 1008 controls a target appliance according to the control pattern selected in Step S1120.

Described next is how the complementary control pattern creating unit 2001 creates a complementary control pattern in Step S2130, with reference to FIGS. 19 and 20.

Figure 19:
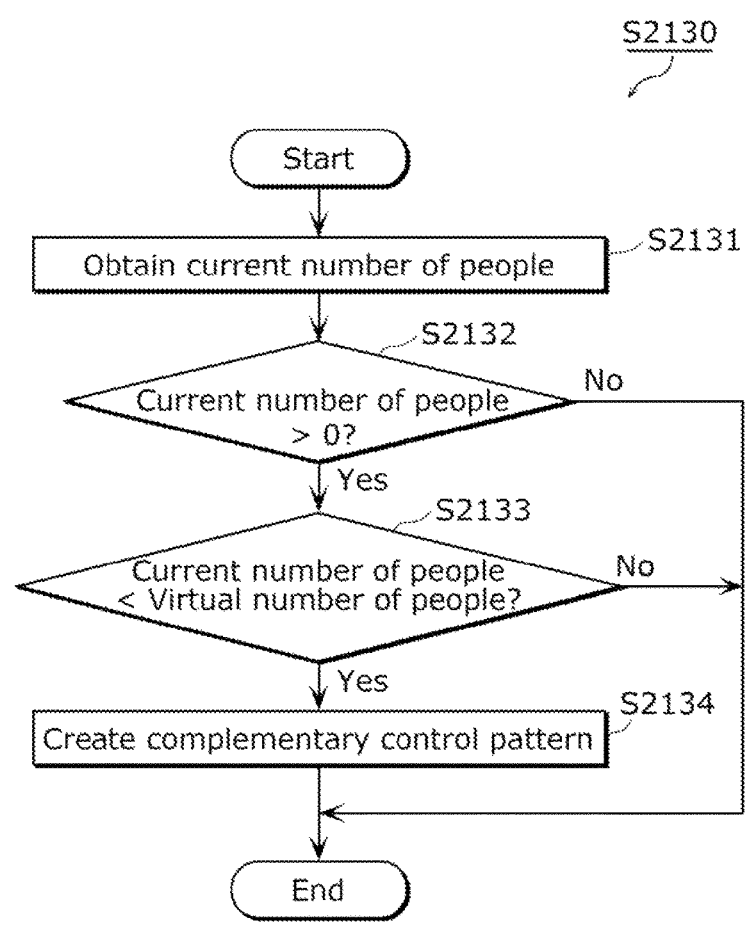
FIG. 19 depicts a flowchart showing a processing operation of a complementary control pattern creating unit according to Embodiment 3.

FIG. 19 depicts a flowchart showing a processing operation of the complementary control pattern creating unit 2001 according to Embodiment 3. FIG. 20 exemplifies a complementary control pattern according to Embodiment 3.

First, the complementary control pattern creating unit 2001 obtains the current number of people from the number-of-people determining unit 1004 (S2131). Here, in the case where the current number of people is one of (i) zero or less (S2132: No) and (ii) larger than or equal to the virtual number of people (S2133: No), the complementary control pattern creating unit 2001 finishes the processing without creating a complementary control pattern.

In contrast, in the case where the current number of people is (i) larger than zero (S2132: Yes) and (ii) smaller than the virtual number of people (S2133: Yes), the complementary control pattern creating unit 2001 creates a complementary control pattern.

Figure 20:
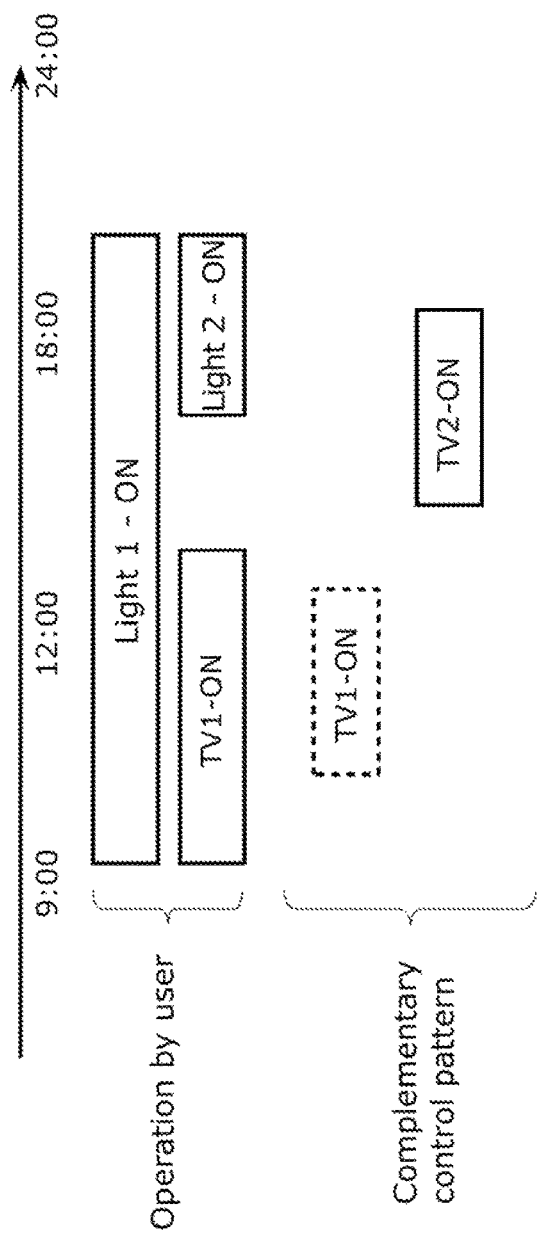
FIG. 20 exemplifies a complementary control pattern according to Embodiment 3.

Specifically, as exemplified in FIG. 20, the complementary control pattern creating unit 2001 extracts, from "TV 1-ON" and "TV 2-ON" included in a selected control pattern, a control instruction for TV2 which has not been operated by the user. Then, the complementary control pattern creating unit 2001 generates the complementary control pattern. Hence, when two users turn on the light 1 and the TV 1, the complementary control pattern creating unit 2001 creates a complementary control pattern, eliminating the redundancy of a control pattern corresponding to the virtual number of people (three people). In other words, in the case where the control instruction of "TV 1-ON" is included in a control pattern when the user turns on the TV 1, the complementary control pattern creating unit 2001 creates a complementary control pattern, eliminating "TV 1-ON" included in the control pattern, in order to place priority on the operation by the user.

As described above, in the case where the current number of people in the budding is smaller than the virtual number of people, the appliance control apparatus 2000 according to Embodiment 3 can control the target appliance. Hence, such a feature makes it possible to automatically determine whether or not the control for deterring an unauthorized intrusion is necessary, which contributes to executing more appropriate appliance control for disguising the number of people in the building.

In addition, in the case where the current number of people in the building is (i) larger than zero and (ii) smaller than the virtual number of people, the appliance control apparatus 2000 according to Embodiment 3 can create a complementary control pattern for controlling a target appliance which has not been operated during a predetermined period. Such a feature can prevent a conflict between an operation by the user and control by the appliance control apparatus, which contributes to executing more appropriate appliance control for disguising the number of people in the building. Furthermore, when there are a few current people, the feature can improve an effect of diminishing a chance for a person in the building to run into an unauthorized intruder there. In particular, the feature is very effective in reducing anxiety of a user living alone.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

For example, the appliance control apparatus 1000 according to Embodiment 1 can control a target appliance when the current number of people in the building is smaller then the virtual number of people. In other words, the appliance control apparatus 1000 may determine whether or not the current number of people in the building is smaller than the virtual number of people, and, based on the determination result, determine whether or not to control the target appliance. Hence, the appliance control apparatus 1000 can automatically determine whether or not the control for deterring an unauthorized intrusion is necessary, and execute more appropriate appliance control for disguising the number of people in the building.

Part or all of the constituent elements constituting the appliance control apparatuses in the embodiments may be configured from a single System-LSI (Large-Scale Integration). For example, an appliance control apparatus may be configured from an integrated circuit including an operation history obtaining unit, a number-of-people determining unit, a control pattern creating unit, and a control unit.

The System-LSI is a super-multi-function LSI manufactured by integrating constituent units on one chip. Specifically, the System-LSI is a computer system including a microprocessor, a ROM, a RAM, or by means of a similar device. The RAM stores a computer program. The System-LSI performs its functions through the microprocessor's operation according to the computer program.

It is noted that, here, System-LSI is mentioned but there are instances where, due to a difference in the degree of integration, the designations IC, LSI, super LSI, and ultra LSI are used. Furthermore, the means for circuit integration is not limited to the LSI, and implementation in the form of a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if an integrated circuit technology that replaces the LSI appears thorough the progress in the semiconductor technology or an other derived technology, that technology can naturally be used to carry out integration of the constituent elements. Biotechnology can be applied to the integrated circuit technology.

Moreover, the present invention is not only implemented in the form of an appliance control apparatus including the above characteristic constituent elements; instead, the present invention may be implemented in the form of an appliance control method including characteristic processing units, included in the appliance control apparatus, in the form of steps. In addition, each of the steps included in the appliance control method may be implemented in the form of a computer program to be executed by a computer. As a matter of course, the computer program may be distributed via a non-transitory computer-readable recording medium such as a compact disc read only memory (CD-ROM), and a communications network such as the Internet.

It is noted that, in the above embodiments, each of the constituent elements may be implemented in a form of dedicated hardware. The constitutional elements may also be implemented through execution of a software program suitable to for each constitutional element. Each of the constitutional elements may be implemented as a program executing unit, such as a CPU and a processor, reads out and executes software program recorded on a recording medium including a hard disc or a semiconductor memory. Here, the software program below may be the one that works as appliance control apparatuses according to the embodiments.

Specifically, the program causes a computer to execute; obtaining an operation history of the target appliance; determining a change in the number of people in the building; creating, based on the operation history and the change in the number of people in the building, control patterns each of which is for controlling the target appliance and corresponds to a different one of the numbers of people including the number of people; selecting, from among the created control patterns each of which corresponds to a different one of the numbers of the people, a control pattern which corresponds to the predetermined virtual number of people; and controlling the target appliance according to the selected control pattern.

It is noted that, in each of the embodiments, the constituent elements included in the appliance control apparatus may be implemented in the form of two or more devices. For example, the appliance control apparatus may be implemented in the form of an appliance control system including a control server and a control terminal. Described below is an exemplary appliance control system with reference to the drawings.

Figure 21:
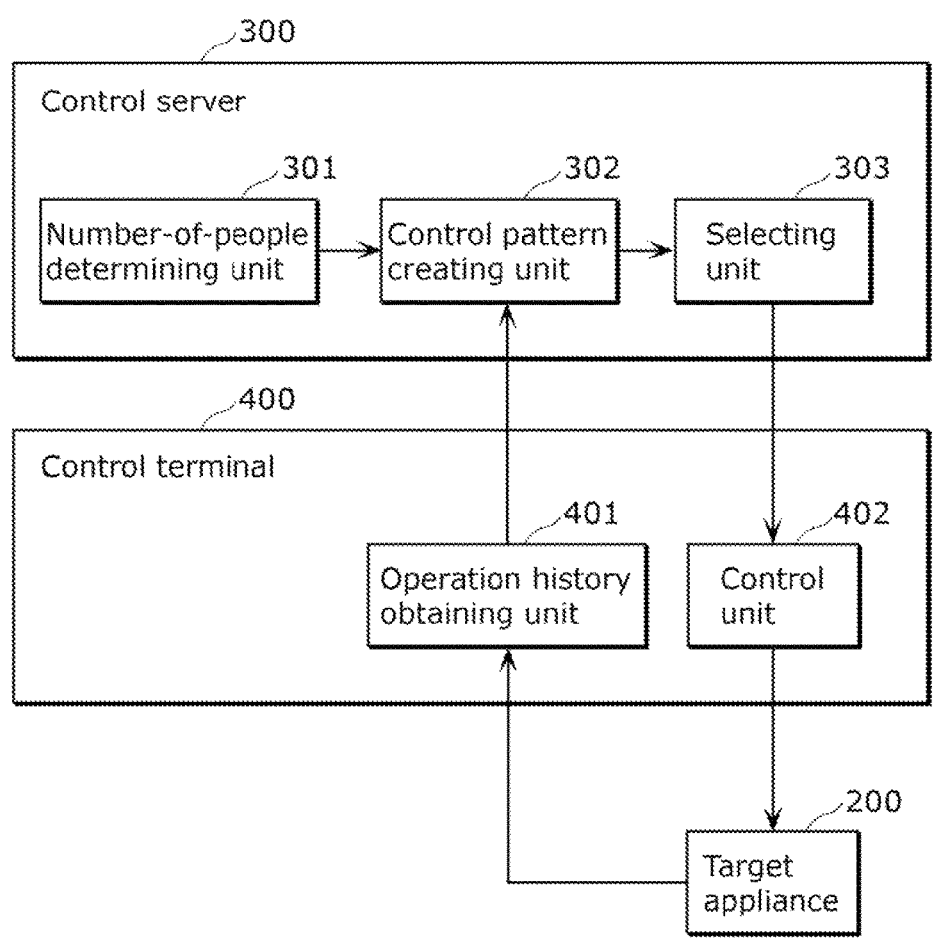
FIG. 21 depicts a block diagram showing a structure of an appliance control system in a modification according to Embodiments 1 to 3.

FIG. 21 depicts a block diagram showing a structure of an appliance control system in Modification. The appliance control system includes a control server 300 and a control terminal 400. The control server 300 and the control terminal 400 are connected each other via a network. It is noted that the control server 300 may be a crowd server.

In order to disguise the number of people in the building, the control server 300 transmits to a control terminal a control pattern for controlling the target appliance 200 located in a building. The control server 300 includes a number-of-people determining unit 301, a control pattern creating unit 302, and a selecting unit 303.

The number-of-people determining unit 301 determines a change in the number of people in a building, as the number-of-people determining unit 102 does so in Embodiment 1.

Based on an operation history and the change in the number of people in the building, the control pattern creating unit 302 creates control patterns each of which is for controlling the target appliance 200 and corresponds to a different one of the numbers of people, as the control pattern creating unit 103 does so in Embodiment 1.

From among the created control patterns each corresponding to a different one of the number of people, the selecting unit 303 selects a control pattern which corresponds to a predetermined virtual number of people. Then, the selecting unit 303 transits the selected control pattern to the control terminal 400.

In order to disguise the number of people in the building, the control terminal 400 controls the target appliance 200 located in the building. The control terminal 400 includes an operation history obtaining unit 401 and a control unit 402.

Similar to the operation history obtaining unit 101 according to Embodiment 1, the operation history obtaining unit 401 obtains the operation history of the target appliance 200. Furthermore, the operation history obtaining unit 401 transmits the obtained operation history to the control server 300.

The control unit 402 receives from the control server 300 a control pattern for controlling the target appliance 200. Then, according to the received control pattern, the control unit 402 controls the target appliance 200.

Hence the appliance control system can achieve similar functions to and effects of the appliance control apparatus 100 according to Embodiment 1.

INDUSTRIAL APPLICABILITY

The appliance control apparatus according to an implementation of the present invention is effective, for example, in automatically controlling an appliance located in a building in order to deter an unauthorized intrusion in the building.

REFERENCE SIGNS LIST 100, 1000, 2000 Appliance control apparatus
101, 401, 1002 Operation history obtaining unit
102, 301, 1004 Number-of-people determining unit
103, 302, 1005 Control pattern creating unit
104, 402, 1008 Control unit
200 Target appliance
300 Control server
303 Selecting unit
400 Control terminal
1001 Communications unit
1003 Operation history accumulating unit
1006 Control pattern accumulating unit
1007 User interface unit
1009 Distribution board status obtaining unit
1010 Appliance location defining unit
1011 Appliance location information accumulating unit
2001 Complementary control pattern creating unit

The invention claimed is:

1. An appliance control method for controlling a target appliance located in a building to disguise the number of people in the building, the appliance control method controlling the target appliance by performing, with a microprocessor, processing comprising:
obtaining, from a memory, an operation history of the target appliance;
determining a change in the number of people in the building;
creating, based on the operation history and the change in the number of people in the building, control patterns each of which is for controlling the target appliance and corresponds to a different one of the numbers of people including the number of people;
receiving an instruction for disguise of the number of people in the building;
selecting, from among the created control patterns each of which corresponds to a different one of the numbers of the people, a control pattern which corresponds to a predetermined virtual number of people, based on the instruction for disguise;
determining whether a current number of people in the building is smaller than the predetermined virtual number of people; and
controlling the target appliance according to the selected control pattern when the current number of people in the building is determined to be smaller than the predetermined virtual number of people.

2. The appliance control method according to claim 1, wherein the creating includes creating the control patterns each of which corresponds to a different one of the numbers of the people, by associating an operation detail included in the operation history with the number of people in the building according to the change in the number of people in the building and an operation time included in the operation history.

3. The appliance control method according to claim 1, wherein the determining includes determining the change in the number of people in the building based on how frequently a user has carried out an operation, the frequency being obtained from the operation history.

4. The appliance control method according to claim 1, wherein the obtaining includes obtaining operation histories of target appliances located in the building,
the creating includes creating control patterns each of which is for controlling the target appliances and corresponds to a different one of the numbers of the people, and
the controlling includes controlling, according to the selected control pattern, only a target appliance included in the target appliances and located in a target zone which is at least one of zones that are created based on a layout of the building.

5. The appliance control method according to claim 4, wherein the creating includes creating, for each of the zones, control patterns, each of which corresponds to a different one of the numbers of the people, based on (i) an operation history of a target appliance included in the target appliances and located in the zone and (ii) the change in the number of people in the building, and
the selecting includes selecting a control pattern from among the control patterns each of which corresponds to a different one of the numbers of the people, the selected control pattern corresponding to the predetermined virtual number of the people and the target zone.

6. The appliance control method according to claim 5, wherein the determining includes determining a change in the number of people in each of the zones, and
the creating includes creating, for each of the zones, control patterns, each of which corresponds to a different one of the numbers of the people, based on (i) an operation history of a target appliance included in the target appliances and located in the zone, and (ii) the change in the number of people in the zone.

7. The appliance control method according to claim 1, wherein the obtaining includes obtaining operation histories of appliances located in the building, and
the determining includes determining the change in the number of people in the building based on a time interval between operations on the appliances and locations of the appliances, the operations being obtained from the operation histories.

8. The appliance control method according to claim 7, further comprising
defining the locations of the appliances by (i) comparing the operation histories with a change of power supplied to each of areas in the building and (ii) defining an area, included in the areas, in which each of the appliances is located,
wherein the determining includes determining the change in the number of people in the building based on the defined locations of the appliances.

9. The appliance control method according to claim 1,
wherein the creating includes extracting an operation only from a time unit, among time units, indicating as many operations as a threshold or more, and, based on the extracted operation and the change in the number of people in the building, creating the control patterns each of which corresponds to a different one of the numbers of the people, the time units being included in the operation history and each having predetermined duration, and the control patterns each being created for a different one of the time units.

10. An appliance control method for controlling a target appliance located in a building to disguise the number of people in the building, the appliance control method controlling the target appliance by performing, with a microprocessor, processing comprising:
obtaining, from a memory, an operation history of the target appliance;
determining a change in the number of people in the building;
creating, based on the operation history and the change in the number of people in the building, control patterns each of which is for controlling the target appliance and corresponds to a different one of the numbers of people including the number of people;
receiving an instruction for disguise of the number of people in the building;
selecting, from among the created control patterns each of which corresponds to a different one of the numbers of the people, a control pattern which corresponds to a predetermined virtual number of people, based on the instruction for disguise; and
controlling the target appliance according to the selected control pattern,
wherein:
the controlling includes controlling the target appliance in a case where the current number of people in the building is smaller than the predetermined virtual number of the people,
the obtaining includes obtaining operation histories of target appliances located in the building,
the creating includes creating control patterns each of which is for controlling the target appliances and corresponds to a different one of the numbers of people,
the appliance control method further comprises:
in the case where the current number of the people in the building is larger than zero and smaller than the predetermined virtual number of the people, creating a complementary control pattern by extracting a control instruction from among control instructions included in the control pattern that corresponds to the virtual number of the people, the extracted control instruction being sent to a target appliance which is included in the target appliances and has not been operated for a predetermined period in the operation history, and
in the case where the virtual number of the people is larger than the current number of the people in the building, the controlling includes controlling the target appliances according to the complementary control pattern instead of the selected control pattern.

11. An appliance control apparatus including at least one microprocessor for controlling a target appliance located in a building to disguise the number of people in the building, the appliance control apparatus comprising:
an operation history obtaining unit configured to obtain an operation history of the target appliance;
a number-of-people determining unit configured to determine a change in the number of people in the building;
a control pattern creating unit configured to create, based on the operation history and the change in the number of people in the building, control patterns each of which is for controlling the target appliance and corresponds to a different one of the numbers of people including the number of people;
a receiver configured to receive an instruction for disguise of the number of people in the building; and
a control unit configured to:
(i) select, from among the created control patterns each of which corresponds to a different one of the numbers of the people, a control pattern which corresponds to a predetermined virtual number of people, based on the instruction for disguise,
(ii) determining whether a current number of people in the building is smaller than the predetermined virtual number of people, and
(iii) control the target appliance according to the selected control pattern when the current number of people in the building is determined to be smaller than the predetermined virtual number of the people.

12. A control server including at least one microprocessor for transmitting, to a control terminal, a control pattern for controlling a target appliance located in a building to disguise the number of people in the building, the control server comprising:
a number-of-people determining unit configured to determine a change in the number of people in the building;
a control pattern creating unit configured to create, based on an operation history of the target appliance and a change in the number of people in the building, control patterns each of which is for controlling the target appliance and corresponds to a different one of the numbers of people including the number of people;
a receiver configured to receive an instruction for disguise of the number of people in the building; and
a selecting unit configured to:
(i) select, from among the created control patterns each of which corresponds to a different one of the numbers of the people, a control pattern which corresponds to a predetermined virtual number of people, based on the instruction for disguise,
(ii) determine whether a current number of people in the building is smaller than the predetermined virtual number of people,
(iii) control the target appliance according to the selected control pattern when the current number of people in the building is determined to be smaller than the predetermined virtual number of people, and
(iv) transmit the selected control pattern to the control terminal.

13. The control server according to claim 12,
wherein the number-of-people determining unit is configured to determine the change in the number of people in the building based on how frequently a user has carried out an operation, the frequency being obtained from the operation history.

14. A control terminal including at least one microprocessor for controlling a target appliance located in a building to disguise the number of people in the building, the control terminal comprising:
an operation history obtaining unit configured to obtain an operation history of the target appliance and transmits the obtained operation history of the target appliance to a control server; and a control unit configured to receive from the control server a control pattern for controlling the target appliance and control the target appliance according to the received control pattern, wherein the control server includes:
- a number-of-people determining unit configured to determine a change in the number of people in the building;
- a control pattern creating unit configured to create, based on an operation history of the target appliance and a change in the number of people in the building, control patterns each of which is for controlling the target appliance and corresponds to a different one of the numbers of people including the number of people;
- a receiver configured to receive an instruction for disguise of the number of people in the building; and
- a selecting unit configured to:
  - (i) select, from among the created control patterns each of which corresponds to a different one of the numbers of the people, a control pattern which corresponds to a predetermined virtual number of people, based on the instruction for disguise,
  - (ii) determine whether a current number of people in the building is smaller than the predetermined virtual number of people,
  - (iii) control the target appliance according to the selected control pattern when the current number of people in the building is determined to be smaller than the predetermined virtual number of people, and
  - (iv) transmit the selected control pattern to the control terminal.

15. A non-transitory computer-readable recording medium for use in a computer, the recording medium having a computer program recorded thereon for causing a computer to execute the appliance control method according to claim 1.

* * * * *